(12) United States Patent
Polaganga et al.

(10) Patent No.: US 12,309,588 B2
(45) Date of Patent: May 20, 2025

(54) RESTRICTING NETWORK ACCESS FOR UNAUTHORIZED USER DEVICES

(71) Applicant: T-Mobile USA, Inc., Bellevue, WA (US)

(72) Inventors: Roopesh Kumar Polaganga, Bellevue, WA (US); Ramesh Venkata Josyula, Bellevue, WA (US); Jun Wang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 350 days.

(21) Appl. No.: 17/868,706

(22) Filed: Jul. 19, 2022

(65) Prior Publication Data

US 2024/0031810 A1  Jan. 25, 2024

(51) Int. Cl.
*H04W 48/02* (2009.01)
*H04W 8/22* (2009.01)
*H04W 12/08* (2021.01)

(52) U.S. Cl.
CPC ............. *H04W 12/08* (2013.01); *H04W 8/22* (2013.01)

(58) Field of Classification Search
CPC .............................. H04W 48/02; H04W 48/10
See application file for complete search history.

(56) References Cited

U.S. PATENT DOCUMENTS

| | | | |
|---|---|---|---|
| 7,599,983 B2 | 10/2009 | Harper et al. | |
| 7,770,217 B2 | 8/2010 | Pueblas | |
| 8,615,593 B2 | 12/2013 | Ch'ng et al. | |
| 8,750,265 B2 | 6/2014 | Scherzer et al. | |
| 8,868,025 B2 | 10/2014 | Ganesh et al. | |
| 8,938,233 B2 | 1/2015 | Hsu | |
| 9,155,105 B2 | 10/2015 | Hsu | |
| 9,226,119 B2 | 12/2015 | Suryavanshi et al. | |
| 9,264,979 B2 | 2/2016 | Fong et al. | |
| 9,538,454 B2 | 1/2017 | Hwang et al. | |
| 9,615,314 B2 | 4/2017 | Fong et al. | |
| 9,655,020 B2 | 5/2017 | Wegmann et al. | |
| 9,655,029 B2 | 5/2017 | Fong et al. | |
| 9,691,201 B2 | 6/2017 | Myers et al. | |
| 9,743,341 B2 | 8/2017 | Pinheiro et al. | |
| 9,843,480 B2 | 12/2017 | Caldwell et al. | |

(Continued)

FOREIGN PATENT DOCUMENTS

| | | |
|---|---|---|
| CN | 101480032 B | 8/2013 |
| CN | 104541529 B | 8/2016 |

(Continued)

*Primary Examiner* — Barry W Taylor
(74) *Attorney, Agent, or Firm* — Perkins Coie LLP (57) ABSTRACT

Systems, methods, and devices that enable efficient access control without consuming much network resources at the access node level are disclosed. In one example aspect, a method for wireless communication includes receiving, by a mobile device, a message broadcast by a base station, The message comprises System Information Block (SIB) that indicates an access category having a predefined value. The method includes determining, by the mobile device, whether the access category having the predefined value matches configuration information from a configuration server operated by a network operator. The method also includes selectively attempting to access a network based on the determining.

20 Claims, 9 Drawing Sheets

(56) References Cited

U.S. PATENT DOCUMENTS

| | | |
|---|---|---|
| 9,877,141 B2 | 1/2018 | Schliwa-Bertling et al. |
| 10,212,578 B2 | 2/2019 | Siow et al. |
| 2003/0026231 A1 | 2/2003 | Lazaridis et al. |
| 2004/0015562 A1 | 1/2004 | Harper et al. |
| 2005/0021976 A1 | 1/2005 | Trossen |
| 2007/0236334 A1 | 10/2007 | Borovoy et al. |
| 2007/0260603 A1 | 11/2007 | Tuscano et al. |
| 2008/0025282 A1 | 1/2008 | Hong |
| 2008/0208681 A1 | 8/2008 | Hammad et al. |
| 2009/0164547 A1 | 6/2009 | Ch et al. |
| 2011/0013569 A1 | 1/2011 | Scherzer et al. |
| 2012/0276867 A1 | 11/2012 | Mcnamee et al. |
| 2013/0045706 A1 | 2/2013 | Hsu |
| 2014/0051379 A1 | 2/2014 | Ganesh et al. |
| 2014/0128029 A1 | 5/2014 | Fong et al. |
| 2015/0141005 A1 | 5/2015 | Suryavanshi et al. |
| 2016/0014632 A1 | 1/2016 | Siow et al. |
| 2016/0050615 A1 | 2/2016 | Fong et al. |
| 2016/0253702 A1 | 9/2016 | Gonzales |
| 2019/0082376 A1* | 3/2019 | Hong ............... H04W 76/10 |
| 2020/0178158 A1 | 6/2020 | Won et al. |
| 2021/0022107 A1* | 1/2021 | Kadiri ............... H04W 68/005 |
| 2021/0092668 A1 | 3/2021 | Zaus et al. |
| 2021/0274525 A1* | 9/2021 | Wei ............... H04W 72/23 |
| 2021/0360508 A1* | 11/2021 | Lee ............... H04W 48/02 |
| 2024/0251330 A1* | 7/2024 | Jin ............... H04W 48/18 |

FOREIGN PATENT DOCUMENTS

| | | |
|---|---|---|
| CN | 105103621 B | 12/2018 |
| CN | 111165021 A | 5/2020 |
| CN | 110662276 B | 1/2021 |
| CN | 110169135 B | 12/2021 |
| EP | 2096830 B1 | 8/2011 |
| EP | 1569410 B1 | 7/2015 |
| EP | 2742725 B1 | 8/2018 |
| EP | 3062562 B1 | 4/2020 |
| EP | 3706473 A1 | 9/2020 |
| JP | 2014522163 A | 8/2014 |
| WO | 03107146 A2 | 12/2003 |
| WO | 2013022474 A1 | 2/2013 |
| WO | 2013056143 A1 | 4/2013 |
| WO | 2014160611 A1 | 10/2014 |
| WO | 2018142200 A1 | 8/2018 |

* cited by examiner

RESTRICTING NETWORK ACCESS FOR UNAUTHORIZED USER DEVICES

BACKGROUND

Mobile communication technologies are moving the world toward an increasingly connected and networked society. Ensuring secure communications and preventing authorized users from accessing the network are important aspects of providing reliable communication services to customers.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

To enable efficient access control without consuming much network resources at the access node level, access control information can be included in the System Information Block (SIB) signaling broadcast by the access node so as to allow a user device to determine whether its configuration information from the network carrier matches the access information in the SIB signaling. The user device can refrain from accessing the network when the information does not match (indicating that the user device is not authorized) or attempt access when the information matches (indicating that the user device is authorized).

Figure 1:
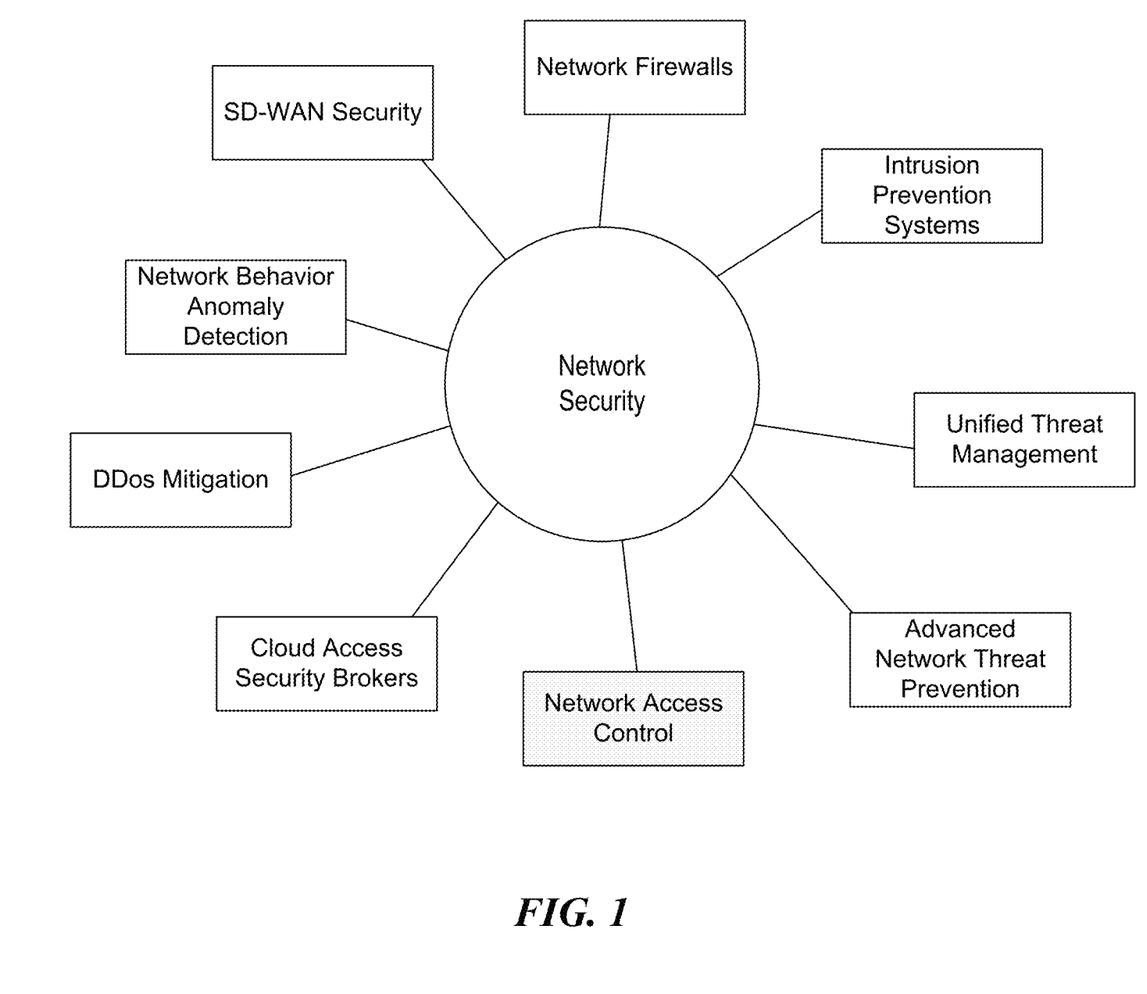
FIG. 1 illustrates several core and emerging areas of network security.

In wireless communications, network security protects the underlying networking infrastructure from unauthorized access, misuse, or theft. Providing network security involves creating a secure infrastructure for devices, applications, and users to work in a safe manner. FIG. 1 illustrates several core and emerging areas of network security. These areas include network firewalls, intrusion prevent systems, unified threat management, advance network threat prevention, cloud access security brokers, Distributed Denial-of-Service (DDos) Mitigation, network behavior anomaly detection, software-defined wide area network (SD-WAN) security, and many others. Among the various security aspects, Network Access Control (NAC) is an important element of network security to restricting un-authorized access. Un-authorized access can include cyber-criminals, hackers, and data thieves, as well as certain known organizations that are deemed as national security threats by government agencies.

In telecommunication systems, network access from individual users is based on two factors: Subscriber Identity Module (SIM) provisioning and a physical device with a unique International Mobile Equipment Identity (IMEI). A SIM card is an integrated circuit that securely stores the International Mobile Subscriber Identity (IMSI) number and the corresponding key. The SIM card is typically issued by network carriers with required provisioning during plan subscriptions. The SIM card can be both physical or virtual (e.g., eSIMs). With respect to the second factor, the SIM card can be issued together with a carrier-provisioned device over which network carriers have direct control. However, the network carrier can also support the Bring your own Device (BYOD) business model to allow users to use their own devices. In those cases, the network carriers do not have direct control of the device models that are used to activate/re-activate SIM cards, leading to additional challenge in network access control.

Figure 2:
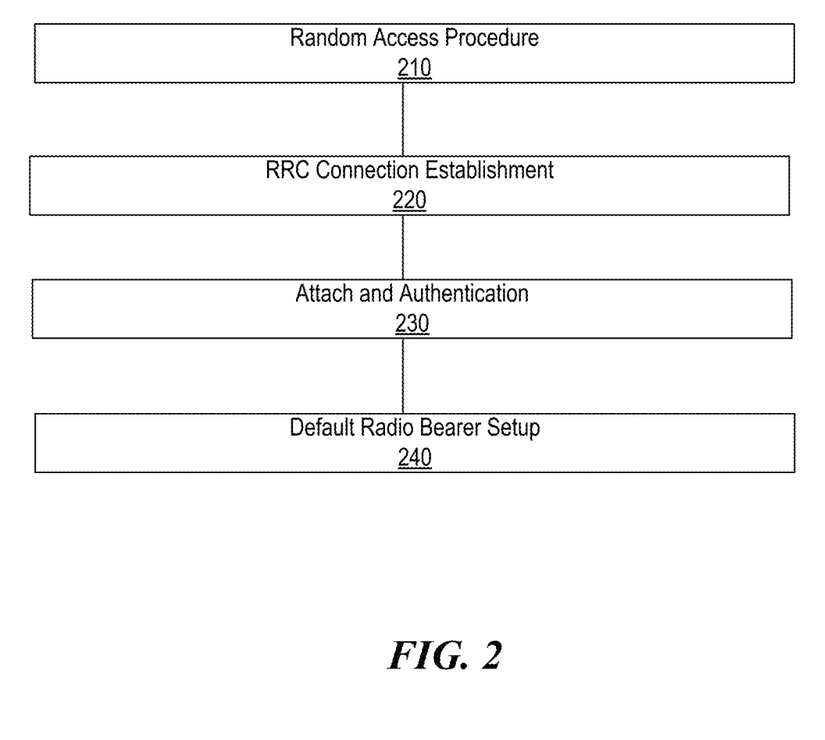
FIG. 2 illustrates an example flowchart of several procedures that a User Equipment (UE) undertakes to gain access to a Long-Term Evolution (LTE) network.

Currently, to determine whether a user device is an unauthorized device with restricted access, the network requires the user device to first gain access to the network before it can compare the device identifier (e.g., IMEI) of the user device with a list of restricted device identifiers. FIG. 2 illustrates an example flowchart of several procedures that a User Equipment (UE) undertakes to gain access to a Long-Term Evolution (LTE) network. Similar RAN-level signaling exchange is also used in Fifth Generation (5G) networks. Each procedure in FIG. 2 includes two multiple signaling messages between the UE and the Radio Access Node (RAN) (also referred to as the base station). For example, the random-access procedure 210 includes transmitting a random-access preamble to the base station and receiving a random-access response from the base station. The Radio Resource Configuration (RRC) Connection Establishment procedure 220 includes sending a connection request to the base station and receiving a connection setup message from the base station. The Attach and Authentication procedure 230 includes more than ten signaling messages to authenticate the UE. The Default Radio Bearer Setup procedure 240 also includes more than ten signaling steps before the first data transmission occurs. With current implementation, a user device with an unauthorized IMEI is denied access during the default radio bearer setup procedure after an exchange of at least 20 signaling messages between the UE and the RAN, leading to a waste of network resources at the RAN level.

This patent document discloses techniques that can be implemented to provide more efficient restrictions of network access prior to the user devices gain access to the core network. Using the disclosed techniques, unauthorized user devices are expected to refrain from attempting to access the network, thereby reducing the signaling overhead at the RAN level.

The advance in 5G wireless communication technology brings a Unified Access Control (UAC) mechanism at the System Information Block (SIB) level to determine whether to allow a UE for a specific services or state changes. Table 1 below shows an example of information elements included in the SIB1 message.

```
SIB1 ::= SEQUENCE {
    ...
    cellAccessRelatedInfo CellAccessRelatedInfo,
    connEstFailureControl ConnEstFailureControl OPTIONAL, -- Need R
    ...
    uac-BarringInfo SEQUENCE {
        uac-BarringForCommon UAC-BarringPerCatList OPTIONAL, --
            Need S
        uac-BarringPerPLMN-List UAC-BarringPerPLMN-List OPTIONAL,
            -- Need S
        uac-BarringInfoSetList UAC-BarringInfoSetList,
        uac-AccessCategory1-SelectionAssistanceInfo CHOICE {
            plmnCommon UAC-AccessCategory1-SelectionAssistanceInfo,
            individualPLMNList SEQUENCE (SIZE (2..maxPLMN))
    OF UAC-AccessCategory1-SelectionAssistanceInfo
        } OPTIONAL -- Need S
    } OPTIONAL, -- Need R
    ...
    UAC-AccessCategory1-SelectionAssistanceInfo ::= ENUMERATED
    {a, b, c}
    UAC-AC1-SelectAssistInfo-r16 ::= ENUMERATED {a, b, c,
        notConfigured}
}
UAC-BarringPerCatList ::= SEQUENCE (SIZE (1..maxAccessCat-1))
OF UAC-BarringPerCat
UAC-BarringPerCat ::= SEQUENCE {
    accessCategory INTEGER (1..maxAccessCat-1),
    uac-barringInfoSetIndex UAC-BarringInfoSetIndex
}
```

In Unified Access Control, each access attempt is categorized into one or more of the Access Identities and one of the Access Categories. Based on the access control information applicable for the corresponding Access Identity and Access Category of the access attempt, the UE performs a test whether the actual access attempt can be made or not. When the UE needs to access the 5G network, the UE first performs access control checks based on the information provided in the SIB1 message to determine if the access is allowed. The Non-Access-Stratum (NAS) layer performs the mapping of the kind of request to one or more access identities and one access category and lower layers perform access barring checks for that request. To determine the access identities and the access category for a request, the NAS checks the reason for access, types of service requested and profile of the UE including UE configurations, against a set of access identities and access categories based on the determined access identities and access category.

Table 2 shows example access identities defined in the Third-Generation Partnership Project (3GPP) Technical Specification (TS) 22.261.

| Access Identity Number | UE Configuration |
|---|---|
| 0 | UE is not configured with any parameters. |
| 1 | UE is configured for Multimedia Priority Service (MPS). |

-continued

| Access Identity Number | UE Configuration |
|---|---|
| 2 | UE is configured for Mission Critical Service (MCS). |
| 3-10 | Reserved for future use |
| 11 | Access Class 11 is configured in the UE. |
| 12 | Access Class 12 is configured in the UE. |
| 13 | Access Class 13 is configured in the UE. |
| 14 | Access Class 14 is configured in the UE. |
| 15 | Access Class 15 is configured in the UE. |

Table 3 shows example access categories defined by the 3GPP TS 22.261.

| Access Category Number | Conditions related to UE | Type of access attempt |
|---|---|---|
| 0 | All | MO signaling resulting from paging |
| 2 | All | Emergency |
| 3 | All except for the conditions in Access Category 1. | MO signaling on NAS level resulting from other than paging |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data not belonging to any other Access Categories |
| 8 | All except for the conditions in Access Category 1. | MO signaling on RRC level resulting from other than paging |
| 9 | All except for the conditions in Access Category 1. | MO IMS registration related signaling |
| 10 | All | MO exception data |
| 11-31 | | Reserved standardized Access Categories |
| 32-63 | All | Based on operator classification. |

The unified access control supports extensibility to allow inclusion of additional standardized Access Identities and Access Categories and supports flexibility to allow operators to define operator-defined Access Categories using their own criterion (e.g., applications and security concerns). When there is an Access Category based on operator classification and a standardized Access Category to both of which an access attempt can be categorized, and the standardized Access Category is neither paging or emergency, the UE applies the Access Category based on operator classification. When there is an Access Category based on operator classification and a standardized Access Category to both of which an access attempt can be categorized, and the standardized Access Category is paging or emergency, the UE applies the standardized Access Category.

Incorporating access control for unauthorized devices into the standardized and/or the operator-defined Access Categories can greatly reduce the signaling overhead at the RAN level. For example, a value in the reserved standard access category can be used to indicate that the access of the UE is authorized. Alternatively, or in addition, a value in the operator classification range can be used to indicate that the access of the UE is authorized. In some embodiments, using the access category values allows the network carrier to provide fine control of various access scenarios. For example, specific values indicating authorization for different types of applications (e.g., SMS, video, or voice) can be used, thereby allowing versatile and flexible access control at the SIB level without consuming any RAN level resources.

When a SIM card (either a physical SIM card or an eSIM) is associated with a new device that it has not been associated with previously (e.g., being activated for the first time), the device communicates with a configuration server of the carrier so that the device can receive carrier-specific settings. The device can further receive periodic updates from the configure server when settings change. The device can be required to provide its identifier (e.g., NEI) to the configuration server each time the device attempts to obtain the carrier-specific settings to allow the configure server to determine whether the device is authorized and provide appropriate settings (e.g., Access Category) for the UAC.

Figure 3:
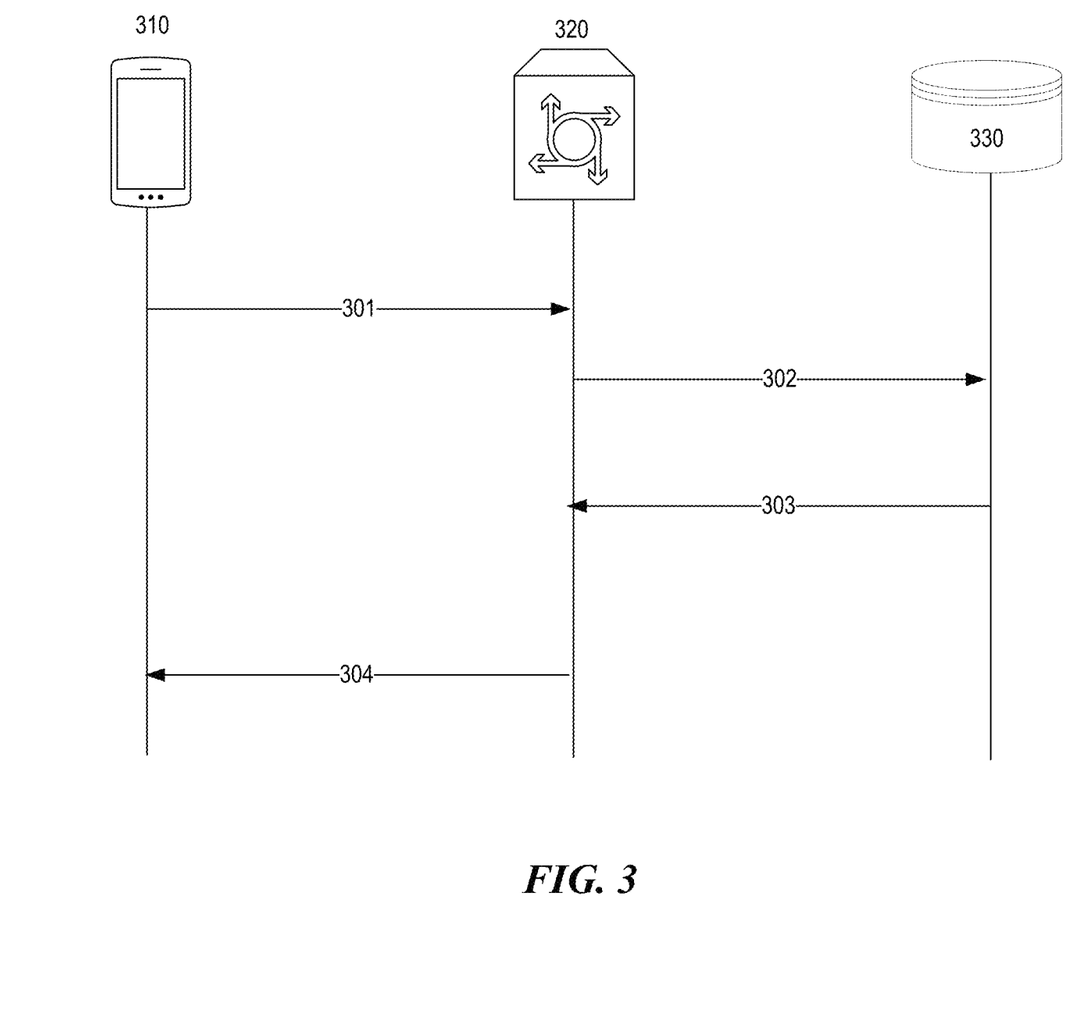
FIG. 3 illustrates an example flowchart of communications between a new device and the configuration server in accordance with one or more embodiments of the present technology.

FIG. 3 illustrates an example flowchart of communications between a newly activated device and the configuration server in accordance with one or more embodiments of the present technology. A valid SIM card configured by the carrier (a physical SIM card or an eSIM) is inserted into or configured in a device 310. The device 310 then transmits a request 301 to activate the SIM card. The request also includes device 310's unique identifier (e.g., NEI). Upon receiving the identifier from the device 310, the configuration server 320 queries the database 330 at operation 302. The database 330 stores a list of known unauthorized devices. The database 330 sends a response 303 to the configuration server indicating whether a match is found.

When the configuration server 320 determines that device 310 is one of the unauthorized devices (e.g., a device from one or more particular Original Equipment Manufacturer, OEM, that has been blacklisted, or a hacked or stolen device), it sends configuration information to the device 310 without an Access Category with a predefined value (e.g., defined as a standardized access category or an operator classification) at operation 304. Subsequently, when the user device receives the SIB1 message, it looks for the Access Category carried in the SIB1 message and finds no match in its configuration, thereby determining that it is barred from accessing the network and making no access attempt.

When the configuration server 320 determines the device 310 is authorized to access the network, it sends configuration information to the device 310 with the Access Category having a predefined value (e.g., defined as a standardized access category or an operator classification) in operation 304. When the device receives the SIB1 message, it looks for the Access Category carried in the SIB1 message and finds a match in its configuration, thereby determining that it can make access attempt at the RAN level to gain access to the network.

The procedure shown in FIG. 3 can be applicable to stolen devices that try to attach to network for service with different SIM profiles. Devices manufactured by certain OEMs that are newly flagged under national security concern can also be restricted based on this procedure.

Figure 4:
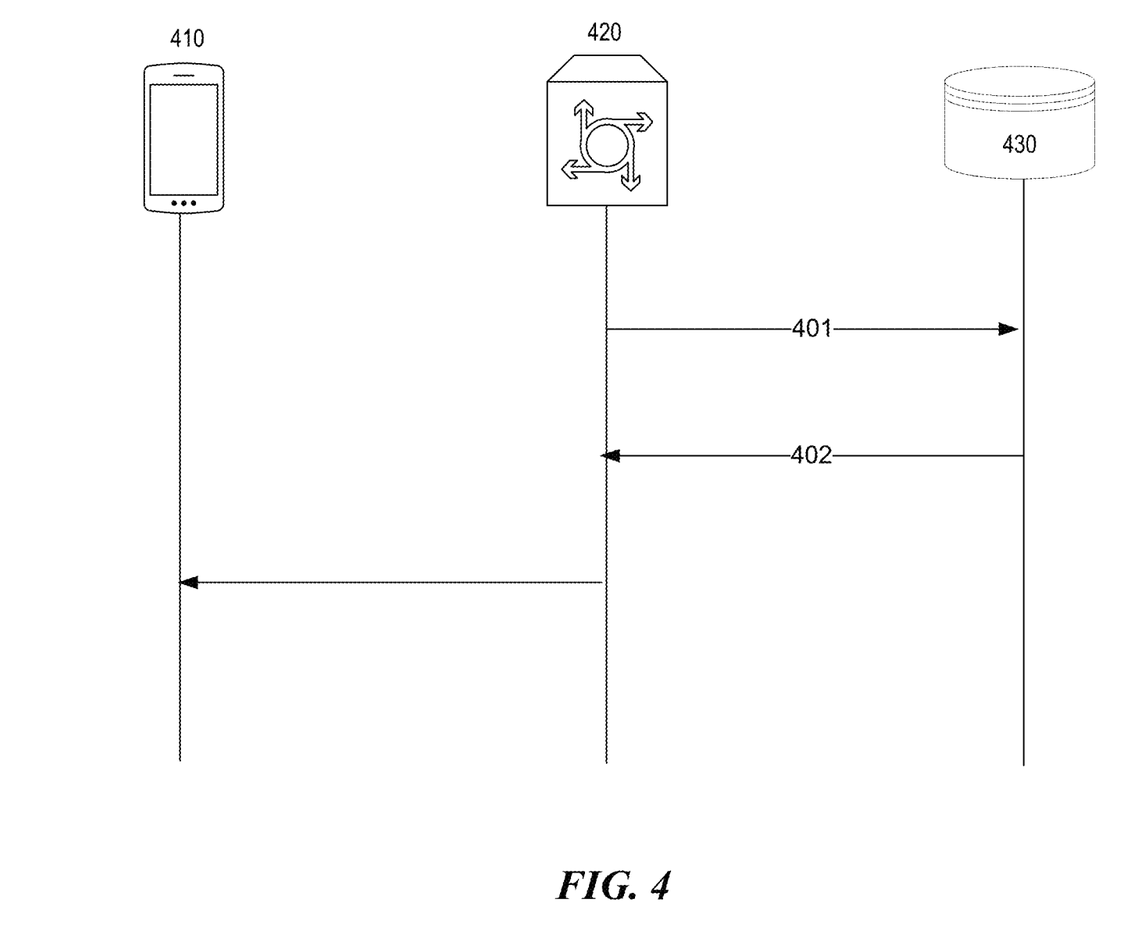
FIG. 4 illustrates an example flowchart of communications between an existing device and the configuration server in accordance with one or more embodiments of the present technology.

FIG. 4 illustrates an example flowchart of communications between an existing device and the configuration server in accordance with one or more embodiments of the present technology. The configuration server 420 and periodically or aperiodically send updates of configuration information to existing devices in the network. For example, the configuration server 420 queries the database 430 at operation 401 to determine whether there is any change in the list of unauthorized devices. The database 430 can send a list of newly known unauthorized devices to the configuration server (e.g., stolen devices, devices from additional OEMs that have been newly blacklisted, etc.) at operation 402. For each of the newly identified device, the configuration server 420 sends a notification message to user device 410 to update the configuration. The prior Access Category value can be removed from the updated configuration such that, when the user device 410 receives the SIB1 message, it looks for the Access Category carried in the SIB1 message and finds no match in its configuration, thereby determining that it is barred from accessing the network and making no access attempt.

Figure 5:
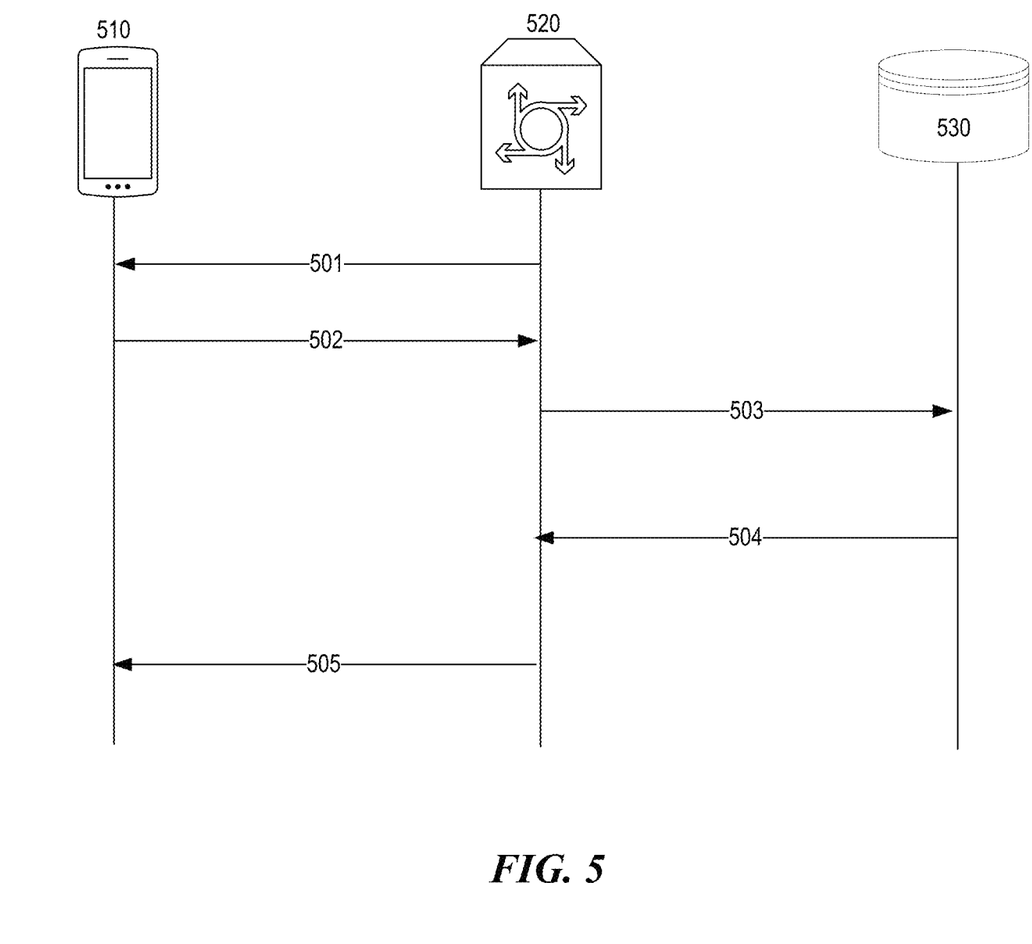
FIG. 5 illustrates another example flowchart of communications between an existing device and the configuration server in accordance with one or more embodiments of the present technology.

FIG. 5 illustrates another example flowchart of communications between an existing device and the configuration server in accordance with one or more embodiments of the present technology. In this example, the configuration server 520 sends a notification message to device 510 at operation 501, indicating that there is an upcoming update of the configuration(s) and requesting the device 510 to transmit its identifier again. The device 510 then transmits its identifier to the configuration server 520 at operation 502. If the device 510 has been stolen or hacked, the identifier may be transmitted with a different SIM profile at this point. The configuration server 520 sends a query to the database 530 at operation 503 to determine whether there is a match between the identifier of the device 510 and the list of known unauthorized device. The database 530 sends a response 504 to the configuration server 520 indicating whether a match is found.

If the configuration server 520 determines that device 510 is one of the unauthorized devices, it sends configuration information to the device 510 without an Access Category having a predefined value at operation 505 such that, when the device receives the SIB1 message, it finds no match in its configuration, thereby determining that it is barred from accessing the network and making no access attempt. If the configuration server 520 determines the device 510 is authorized to access the network, it sends configuration information to the device 510 with the Access Category having the predefined value at operation 505. When the device receives the SIB1 message, it finds a match in its configuration, thereby determining that it can make access attempt at the RAN level to gain access to the network.

The procedures shown in FIGS. 4-5 can be applicable to devices that are affected by changes in national security policies (e.g., additional devices and/or additional OEMs that have been blacklisted) or devices in certain countries during war scenarios for temporary restrictions.

Figure 6:
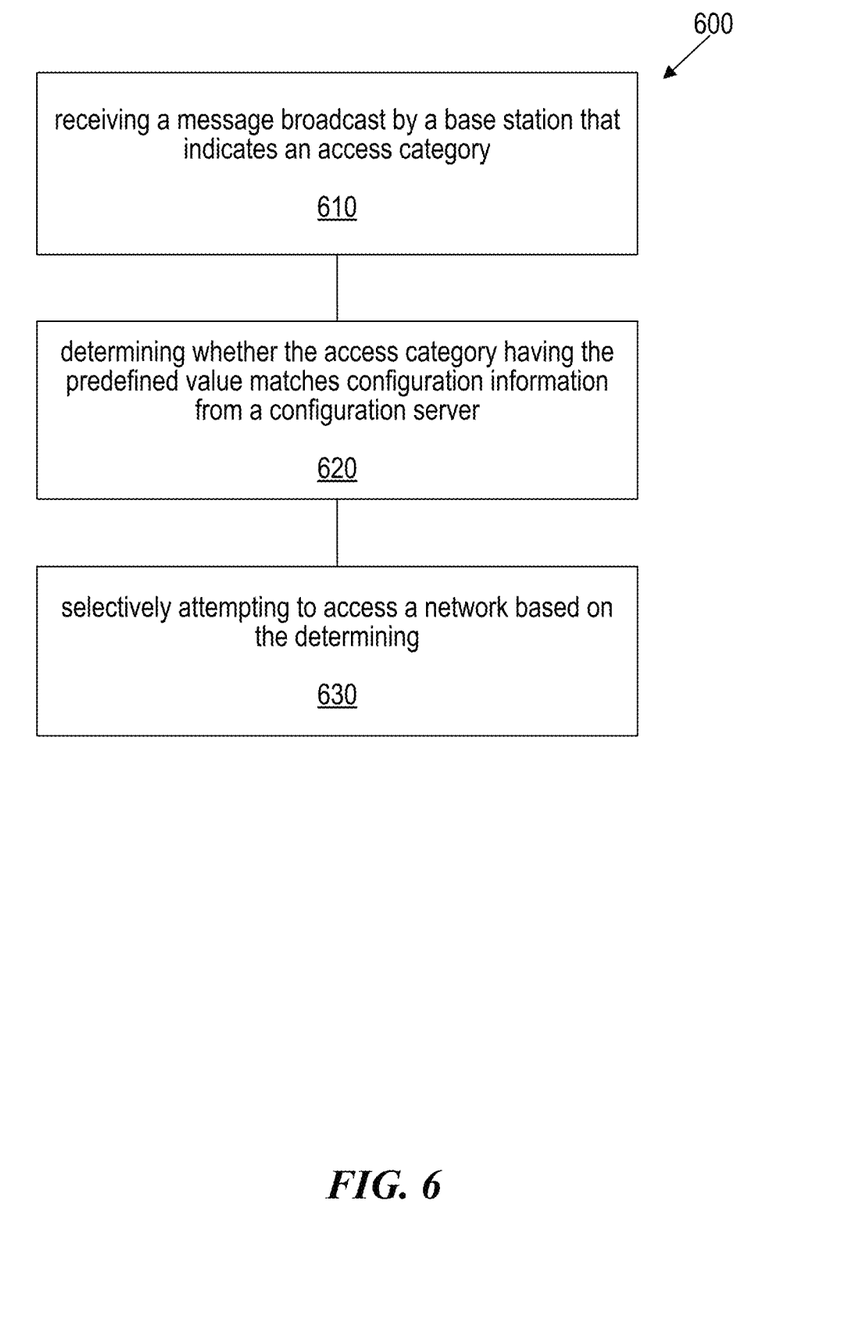
FIG. 6 is a flowchart representation of a process for wireless communication in accordance with one or more embodiments of the present technology.

FIG. 6 is a flowchart representation of a process 600 for wireless communication in accordance with one or more embodiments of the present technology. The process 600 includes, at operation 610, receiving, by a mobile device, a message broadcast by a base station. The message comprises System Information Block (SIB) that indicates an access category having a predefined value. The process 600 includes, at operation 620, determining, by the mobile device, whether the access category having the predefined value matches configuration information from a configuration server operated by a network operator. The process 600 also includes, at operation 630, selectively attempting to access a network based on the determining.

In some embodiments, the predefined value is an operator classification value within a range from 32 to 63 or is a standardized access category in a range from 11 to 31, as shown in Table 3 above. In some embodiments, the selectively attempting to access the network includes accessing the network upon determining that the configuration information from the configuration server includes the access category having the predefined value, and refraining from accessing the network upon determining that the access category having the predefined value is omitted in the configuration information from the configuration server.

In some embodiments, the process includes receiving, by the mobile device, the configuration information from the configuration server. In some embodiments, the configuration information includes the access category in response to the mobile device being an authorized device. In some embodiments, the configuration information excludes the access category in response to the mobile device being an unauthorized device.

In some embodiments, the receiving of the configuration information is performed upon an activation of the mobile device. In some embodiments, the receiving comprises receiving an update of the configuration information periodically or aperiodically from the configuration server. For example, the configuration server can push the updates whenever the database is updates. The configuration server can also send updates periodically (e.g., every day or every week).

Figure 7:
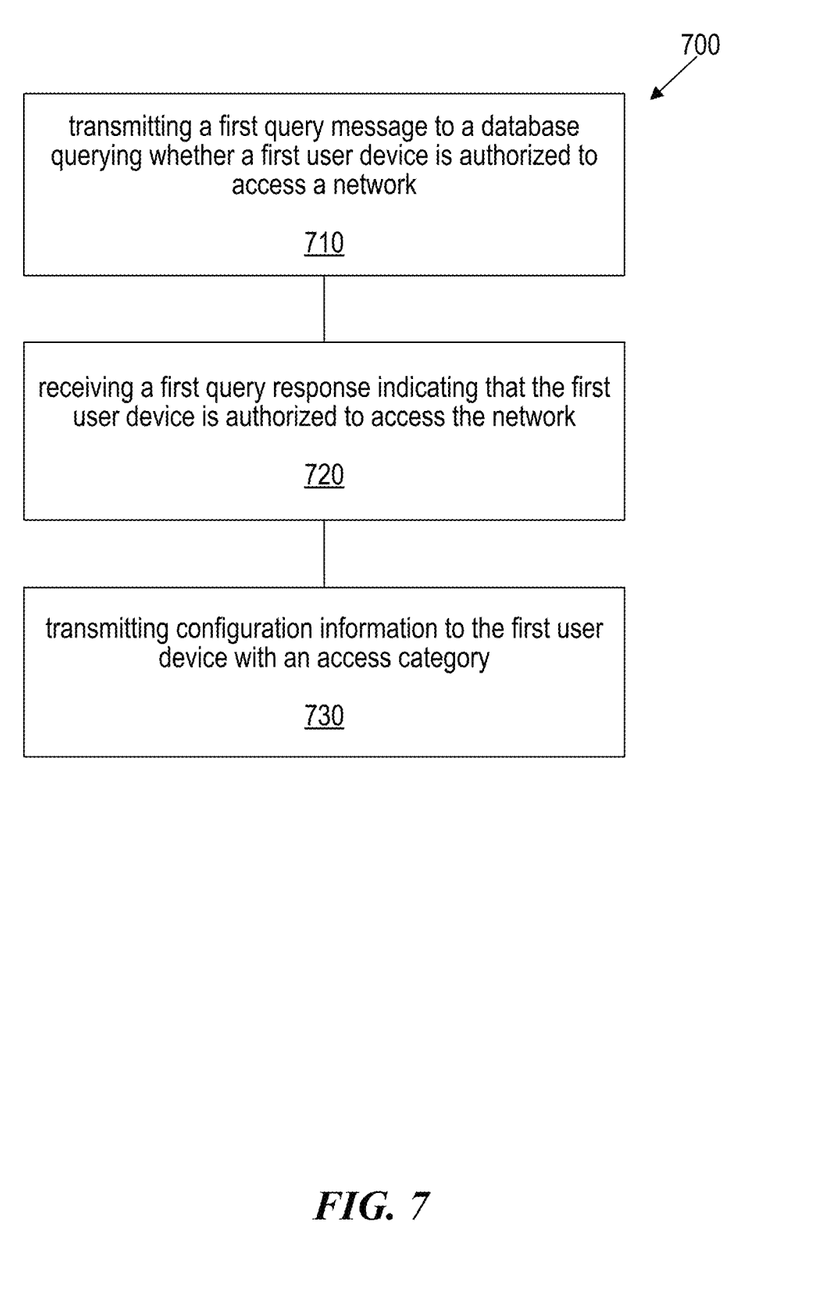
FIG. 7 is a flowchart representation of another process for wireless communication in accordance with one or more embodiments of the present technology.

FIG. 7 is a flowchart representation of a process 700 for wireless communication in accordance with one or more embodiments of the present technology. The process 700 includes, at operation 710, transmitting, by a configuration server, a first query message to a database querying whether a first user device is authorized to access a network. The process 700 includes, at operation 720, receiving, by the configuration server, a first query response indicating that the first user device is authorized to access the network. The process 700 also includes, at operation 730, transmitting, by the configuration server, configuration information to the first user device. The configuration server includes an access category in response to the first user device being authorized to access the network.

In some embodiments, the process 700 further includes transmitting, by the configuration server, a second query message to the database querying whether a second user device is authorized to access a network and receiving, by the configuration server, a second query response indicating that the second user device is unauthorized to access the network. The process 700 also includes transmitting, by the configuration server, configuration information to the second user device. An access category is omitted in the configuration information in response to the second user device being unauthorized to access the network. In some embodiments, the second query response indicates that the second user device is manufactured by an original equipment manufacturer (OEM) that is prohibited to access the network, or the second user device is a stolen or hacked device, or the second user device is in a country or a region that is temporarily prohibited to access the network.

It is thus appreciated that the disclosed techniques can be implemented to allow optimal radio resource utilization and enable better capacity planning and/or congestion control at the RAN level.

Wireless Communications System

Figure 8:
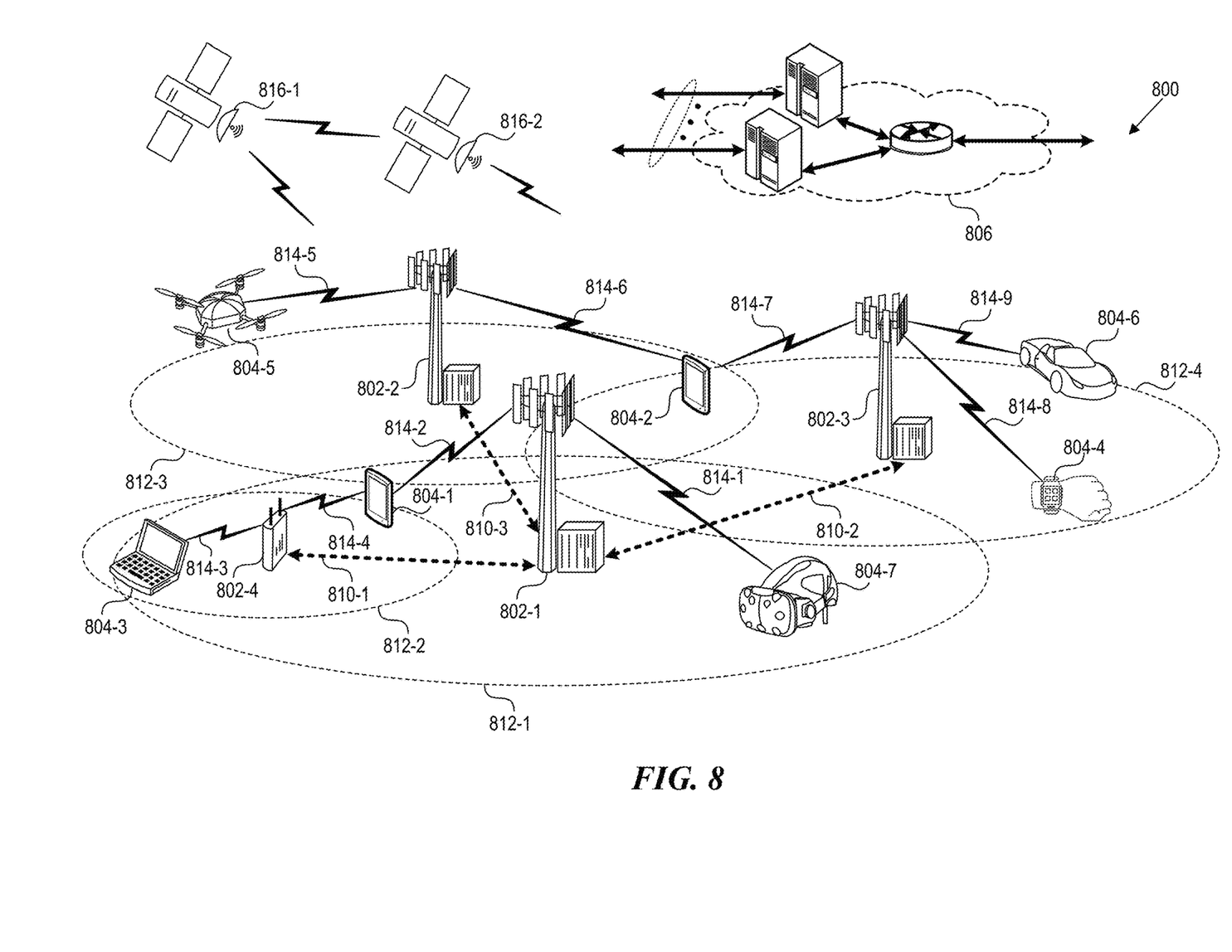
FIG. 8 is a diagram that illustrates a wireless telecommunication network in which aspects of the disclosed technology are incorporated.

FIG. 8 is a diagram that illustrates a wireless telecommunication network 800 ("network 800") in which aspects of the disclosed technology are incorporated. The network 800 includes base stations 802-1 through 802-4 (also referred to individually as "base station 802" or collectively as "base stations 802"). A base station is a type of network access node (NAN) that can also be referred to as a cell site, a base transceiver station, or a radio base station. The network 800 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 800 formed by the network 800 also include wireless devices 804-1 through 804-7 (referred to individually as "wireless device 804" or collectively as "wireless devices 804") and a core network 806. The wireless devices 804-1 through 804-7 can correspond to or include network entities capable of communication using various connectivity standards. For example, a 5G communication channel can use millimeter wave (mmW) access frequencies of 28 GHz or more. In some implementations, the wireless device 804 can operatively couple to a base station 802 over a long-term evolution/long-term evolution-advanced (LTE/LTE-A) communication channel, which is referred to as a 4G communication channel.

The core network 806 provides, manages, and controls security services, user authentication, access authorization, tracking, Internet Protocol (IP) connectivity, and other access, routing, or mobility functions. The base stations 802 interface with the core network 806 through a first set of backhaul links (e.g., S1 interfaces) and can perform radio configuration and scheduling for communication with the wireless devices 804 or can operate under the control of a base station controller (not shown). In some examples, the base stations 802 can communicate with each other, either directly or indirectly (e.g., through the core network 806), over a second set of backhaul links 810-1 through 810-3 (e.g., X1 interfaces), which can be wired or wireless communication links.

The base stations 802 can wirelessly communicate with the wireless devices 804 via one or more base station antennas. The cell sites can provide communication coverage for geographic coverage areas 812-1 through 812-4 (also referred to individually as "coverage area 812" or collectively as "coverage areas 812"). The geographic coverage area 812 for a base station 802 can be divided into sectors making up only a portion of the coverage area (not shown). The network 800 can include base stations of different types (e.g., macro and/or small cell base stations). In some implementations, there can be overlapping geographic coverage areas 812 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 800 can include a 5G network and/or an LTE/LTE-A or other network. In an LTE/LTE-A network, the term eNB is used to describe the base stations 802, and in 5G new radio (NR) networks, the term gNBs is used to describe the base stations 802 that can include mmW communications. The network 800 can thus form a heterogeneous network in which different types of base stations provide coverage for various geographic regions. For example, each base station 802 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 800 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 804 and the base stations 802 or core network 806 supporting radio bearers for the user plane data. At the Physical (PHY) layer, the transport channels are mapped to physical channels.

Wireless devices can be integrated with or embedded in other devices. As illustrated, the wireless devices 804 are distributed throughout the system, where each wireless device 804 can be stationary or mobile. For example, wireless devices can include handheld mobile devices 804-1 and 804-2 (e.g., smartphones, portable hotspots, tablets, etc.); laptops 804-3; wearables 804-4; drones 804-5; vehicles with wireless connectivity 804-6; head-mounted displays with wireless augmented reality/virtual reality (ARNR) connectivity 804-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 804-1, 804-2, 804-3, 804-4, 804-5, 804-6, and 804-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 800 equipment at the edge of a network 800 including macro eNBs/gNBs, small cell eNBs/gNBs, relay base stations, and the like. A wireless device can also communicate with other wireless devices either within or outside the same coverage area of a base station via device-to-device (D2D) communications.

The communication links 814-1 through 814-9 (also referred to individually as "communication link 814" or collectively as "communication links 814") shown in network 800 include uplink (UL) transmissions from a wireless device 804 to a base station 802, and/or downlink (DL) transmissions from a base station 802 to a wireless device 804. The downlink transmissions can also be called forward link transmissions while the uplink transmissions can also be called reverse link transmissions. Each communication link 814 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 814 can transmit bidirectional communications using frequency division duplex (FDD) (e.g., using paired spectrum resources) or Time division duplex (TDD) operation (e.g., using unpaired spectrum resources). In some implementations, the communication links 814 include LTE and/or mmW communication links.

In some implementations of the network 800, the base stations 802 and/or the wireless devices 804 include multiple antennas for employing antenna diversity schemes to improve communication quality and reliability between base stations 802 and wireless devices 804. Additionally or alternatively, the base stations 802 and/or the wireless devices 804 can employ multiple-input, multiple-output (MIMO) techniques that can take advantage of multi-path environments to transmit multiple spatial layers carrying the same or different coded data.

In some examples, the network 800 implements 6G technologies including increased densification or diversification of network nodes. The network 800 can enable terrestrial and non-terrestrial transmissions. In this context, a Non-Terrestrial Network (NTN) is enabled by one or more satellites such as satellites 816-1 and 816-2 to deliver services anywhere and anytime and provide coverage in areas that are unreachable by any conventional Terrestrial Network (TN). A 6G implementation of the network 800 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 800 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

Computer System

Figure 9:
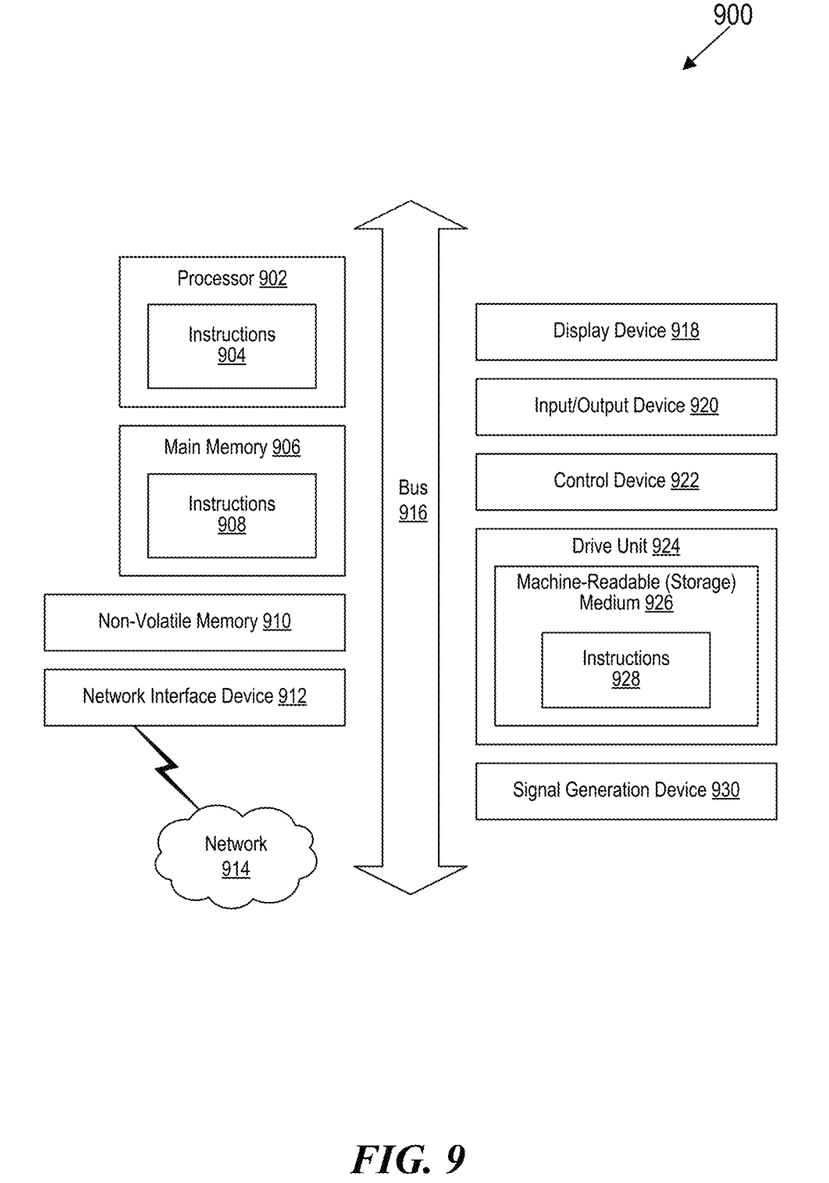
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, video display device 918, an input/output device 920, a control device 922 (e.g., keyboard and pointing device), a drive unit 924 that includes a storage medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 900. In some implementation, the computer system 900 can be an embedded computer system, a system-on-chip (SOC), a single-board computer system (SBC) or a distributed system such as a mesh of computer systems or include one or more cloud components in one or more networks. Where appropriate, one or more computer systems 900 can perform operations in real-time, near real-time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

Remarks

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A method for wireless communication, comprising:
receiving, by a mobile device, a message broadcast by a base station, wherein the message comprises System Information Block (SIB) that indicates an access category having a predefined value;
determining, by the mobile device, whether the access category having the predefined value matches configuration information from a configuration server operated by a network operator; and
selectively attempting to access a network based on the determining,
wherein the selectively attempting to access the network comprises:
accessing the network upon determining that the configuration information from the configuration server includes the access category having the predefined value; and
refraining from accessing the network upon determining that the access category having the predefined value is omitted in the configuration information from the configuration server.

2. The method of claim 1, wherein the predefined value is an operator classification value within a range from 32 to 63 or a standardized access category in a range from 11 to 31.

3. The method of claim 1, further comprising:
receiving, by the mobile device, the configuration information from the configuration server.

4. The method of claim 3, wherein the configuration information includes the access category in response to the mobile device being an authorized device.

5. The method of claim 3, wherein the configuration information excludes the access category in response to the mobile device being an unauthorized device.

6. The method of claim 3, wherein the receiving of the configuration information is performed upon an activation of the mobile device.

7. The method of claim 3, wherein the receiving comprises:
receiving an update of the configuration information periodically or aperiodically from the configuration server.

8. The method of claim 1, further comprising:
transmitting an identifier of the mobile device to the configuration server.

9. A system for wireless communication, comprising:
a database configured to store information indicating whether a user device is authorized to access a network;
a configuration server in communication with the database, the configuration server configured to transmit configuration information of a carrier to a user device, wherein the configuration information excludes an access category having a predefined value in response to the user device being an unauthorized device to access the network; and
an access node configured to broadcast a message comprising System Information Block (SIB) that indicates the access category having the predefined value.

10. The system of claim 9, wherein the predefined value is an operator classification value within a range from 32 to 63.

11. The system of claim 9, wherein the predefined value is a standardized access category in a range from 11 to 31.

12. The system of claim 9, wherein the configuration server is configured to initialize the user device with the configuration information upon activating the user device.

13. The system of claim 9, wherein the configuration server is configured to transmit updated configuration information to the user device periodically or aperiodically.

14. A method for wireless communication, comprising:
transmitting, by a configuration server, a first query message to a database querying whether a first user device is authorized to access a network;

receiving, by the configuration server, a first query response indicating that the first user device is authorized to access the network; and transmitting, by the configuration server, configuration information to the first user device, wherein the configuration server includes an access category in response to the first user device being authorized to access the network, wherein the method further comprises:
transmitting, by the configuration server, a second query message to the database querying whether a second user device is authorized to access a network;

receiving, by the configuration server, a second query response indicating that the second user device is unauthorized to access the network; and transmitting, by the configuration server, configuration information to the second user device, wherein an access category is omitted in the configuration information in response to the second user device being unauthorized to access the network.

15. The method of claim 14, wherein the access category has an operator classification value within a range from 32 to 63.

16. The method of claim 14, wherein the access category has a standardized access category in a range from 11 to 31.

17. The method of claim 14, wherein the second query response indicates that the second user device is manufactured by an original equipment manufacturer (OEM) that is prohibited to access the network.

18. The method of claim 14, wherein the second query response indicates that the second user device is a stolen or hacked device.

19. The method of claim 14, wherein the second query response indicates that the second user device is in a country or a region that is temporarily prohibited to access the network.

20. The method of claim 14, further comprising:
receiving, by the configuration server, an identifier of the first user device to determine whether the first user device is authorized to access the network.

* * * * *